(12) United States Patent (10) Patent No.: US 8,124,027 B2
Lau (45) Date of Patent: Feb. 28, 2012

(54) VOLUMETRIC PIPET

(76) Inventor: Wai Yiu William Lau, Kowloon (HK)

( * ) Notice: Subject to any disclaimer, the term of this patent is extended or adjusted under 35 U.S.C. 154(b) by 336 days.

(21) Appl. No.: 12/390,521

(22) Filed: Feb. 23, 2009

(65) Prior Publication Data
US 2010/0196211 A1 Aug. 5, 2010

(51) Int. Cl.
B01L 3/02 (2006.01)
(52) U.S. Cl. ........ 422/501; 422/500; 422/547; 422/550; 422/920; 422/922; 73/863.32; 73/864; 73/864.01
(58) Field of Classification Search ............... 73/863.32, 73/864, 864.01; 422/501, 500, 547, 550, 422/920, 922
See application file for complete search history.

(56) References Cited

U.S. PATENT DOCUMENTS
4,436,631 A * 3/1984 Graham et al. ............... 210/772
(Continued)

Primary Examiner — Brian R Gordon
(74) Attorney, Agent, or Firm — Jason J. Su; Tech Miner, LLC

(57) ABSTRACT

The invention relates to a kind of volumetric pipet. It includes an outer casing. At the lower part of the outer casing, there is a fetching mouth which is detachably mounted to a liquid container. At the top of the outer casing, there is a detachably sealed top cover. Inside the outer casing, there is a hollow core with a top opening. There is an inlet mouth on the side wall of the core that corresponds to the fetching mouth. The internal wall of the outer casing can slide against the external wall of the core. The core's rotating or sliding along its longitudinal orientation makes the fetching mouth and the inlet mouth correspond or stagger. This invention provides an easy-to-operate, precise rationing, quick and sanitary volumetric pipet.

13 Claims, 4 Drawing Sheets

U.S. PATENT DOCUMENTS

| | | | |
|---|---|---|---|
| 4,563,332 A * | 1/1986 | Mitchell et al. | 422/501 |
| 4,603,114 A * | 7/1986 | Hood et al. | 436/89 |
| 4,622,847 A * | 11/1986 | Paoletti et al. | 73/61.65 |
| 5,192,511 A * | 3/1993 | Roach | 422/525 |
| 5,427,741 A * | 6/1995 | Bennett | 422/547 |
| 5,512,248 A * | 4/1996 | Van | 422/501 |
| 5,639,426 A * | 6/1997 | Kerr et al. | |
| 6,551,558 B1 * | 4/2003 | Mann et al. | |
| 6,787,367 B1 * | 9/2004 | Suovaniemi et al. | |
| 6,908,226 B2 * | 6/2005 | Siddiqui et al. | |
| 7,378,057 B2 * | 5/2008 | Arter et al. | |
| 7,740,802 B2 * | 6/2010 | Bala | 422/550 |
| 7,790,115 B2 * | 9/2010 | Sogaro | |
| 7,837,943 B2 * | 11/2010 | Jeong et al. | |
| 7,879,293 B2 * | 2/2011 | Niedbala et al. | 422/501 |
| 2003/0223914 A1 * | 12/2003 | Arter et al. | |
| 2005/0284239 A1 * | 12/2005 | Chuang | |
| 2007/0056350 A1 * | 3/2007 | Cueni et al. | |
| 2010/0000341 A1 * | 1/2010 | Hasegawa et al. | |
| 2010/0077843 A1 * | 4/2010 | Doraisamy et al. | |
| 2010/0227387 A1 * | 9/2010 | Safar et al. | |

* cited by examiner

VOLUMETRIC PIPET

FIELD OF THE INVENTION

The invention involves a pipet, particularly, it is a volumetric pipet.

BACKGROUND OF THE INVENTION

In our daily life or work, from time to time we need to fetch a certain amount of liquid, such as liquid medicine and chemical reagent. In order to get the needed amount of liquid, we often need to use scaled bottles or scaled straws, or, we may pour the liquid into a flask or measuring cup before use it. The shortcomings are: 1. too many steps in the fetching procedure are involved, and it is easy to contaminate, 2. the procedure for repeated observing and pouring the exact amount of liquid is lengthy and boring, and it is hard to be precise, 3. for the old people, children and people not being well educated, they may have difficulties in correctly understanding and precisely handling the scales of the measuring tools and the containers, making it inconvenient to use in their daily life. Some people can only estimate the medicine they have fetched, leaving a significant discrepancy in quantity and affecting the effect of the medicines. In addition, while pouring the medicines, it's hard to avoid a small quantity of medicine that flows down along the mouth of the flask.

SUMMARY OF THE INVENTION

This invention intends to solve the problems in the current technology such as troubles in fetching the liquid, possibilities of contamination and difficulties to be precise, and provides an easy-to-operate, fast and sanitary volumetric pipet.

The invention addresses the above technical issues with following technical solutions: it is a volumetric pipet that includes an outer casing. At the lower part of the outer casing, there is a fetching mouth which is detachably fixed on a liquid container. At the top of the outer casing, there is a detachable sealed top cover. Inside the outer casing, there is a hollow core with a top opening. There is an inlet mouth on the side wall of the core that corresponds to the fetching mouth. The internal wall of the outer casing can slide against the external wall of the core. The core's rotating or sliding longitudinally along the outer casing makes the fetching mouth and the inlet mouth correspond or stagger.

One of the technical solutions is: the top cover is coupled to the top of the outer casing with thread. There is a rotating mechanism between the top cover and the core. Through the rotating mechanism, rotate the top cover can drive the core to rotate. There is a convoluting mechanism between the core and the outer casing. Through the convoluting mechanism, the after-rotating core can rotate to its original position.

In the rotating mechanism, there is a step on the top of the core. There is a block located on the bottom of the top cover that corresponds to the step. While rotating the top cover, as the step side is propped up by the block, the core is driven to rotate.

The convoluting mechanism includes a convoluting elastic component located on the bottom of the core. One end of the elastic component is fixed on the outer casing; the other end is fixed on the core, driving the after-rotating core to rotate to its original position by the elasticity of the convoluting elastic component.

There are matching steps in the middle of the core's external wall and in the middle of the outer casing's internal wall. There is a positioner between the core and the outer casing's internal wall. The positioner includes a heave located on the core's external step and a block located on the outer casing's internal step which corresponds to the heave. While the core rotates and the block on the outer casing's internal wall is propped up to the side of the heave, the fetching mouth and inlet mouth are completely corresponding and connecting.

Without mounting the top cover, the inlet mouth and the fetching mouth stagger. The angle formed by the staggering rotation of the inlet mouth and the fetching mouth is the same as the one formed by the rotation of the heave on the core's external wall and the block on the step in the middle of the outer casing. While the fetching mouth and the inlet mouth corresponding and connecting completely, the bevel on the bottom of the volumetric tube corresponds to the bevel on the lower internal wall of the core, forming a complete bevel. The length of the thread on the top cover is: while rotating the top cover tightly to the outer casing, the heave on the middle of the core's external wall and the block on the step in the middle of the outer casing props up each other, the inlet mouth and the fetching mouth completely corresponding and connecting.

There is a volumetric tube on the bottom of the top cover. The external wall of the volumetric tube and the internal wall of the core can slide against each other. The bottom of the volumetric tube is a bevel. The highest point of the volumetric tube's bevel vertically corresponds to the block on the top cover's bottom. The lower part on the internal wall of the core also has a bevel whose angle is identical to the one of the volumetric tube's bevel. The core's internal wall and the volumetric tube enclose a rationing cavum which inclines toward the upper edge of the inlet mouth.

The fetching mouth inclines upward. The angle $\alpha$ between the center line of the fetching mouth and the center line of the core is no greater than the angle $\beta$ between the bevel on the volumetric tube's bottom, bevel at the core's lower internal wall and the center line of the core.

Another technical solution is: there is a bottom cover which is detachably fixed to the lower end of the outer casing. There is an elastic component between the bottom cover and the core's bottom which stretches and compresses longitudinally along the outer casing. While the elastic component compresses, the fetching mouth on the outer casing and the inlet mouth on the core completely corresponding and connecting. While the elastic component stretches and the core moves upward. The fetching mouth on the outer casing and the inlet mouth on the core will stagger each other. The outer casing has a limitator to prevent the core from disengaging the top of the outer casing.

The top cover is coupled to the top of the outer casing with thread. The lower end of the outer casing is coupled to the bottom cover with thread. The lower part of the elastic component is fixed on the top of the bottom cover. There are matching steps respectively on the internal wall at the middle of the outer casing and on the core's external wall above the inlet mouth. The limitator is a step located at the middle of the outer casing's internal wall. The core is limited when it moves upwards to the step on the core's external wall and props up the step on the outer casing.

There is a volumetric tube at the center of the top cover's bottom. The external wall of the volumetric tube and the internal wall of the core can slide against each other. The bottom of the volumetric tube is a bevel. There is also a bevel on the internal wall of the lower core whose angle is the same as the one of the volumetric tube's bevel. While the fetching mouth and the inlet mouth completely corresponding and connecting, the bevel on the bottom of the volumetric tube corresponds to the bevel on the internal wall at the lower part of the core, forming a complete bevel. The internal wall of the core and the volumetric tube encloses a rationing cavum which inclines toward the upper edge of the inlet mouth. The elastic component has a Ω-shaped longitudinal section. Its top props up the bottom of the core. Its bottom is fixed on the top of the bottom cover.

The fetching mouth inclines upward. The angle α between the center line of the fetching mouth and the center line of the core is no greater than the angle β between the bevel on the volumetric tube's bottom, bevel at the core's lower internal wall and the center line of the core.

This invention features a structure of an outer casing, a core and a top cover. Through the rotating of the top cover and the vertically sliding of the core, the movements of inletting the liquid into the volumetric pipet then closing the inlet mouth are carried out. The internal cavum of the core is a volumetric pipet. By using the volumetric pipet, each fetching of the liquid with a certain column is fast and easy. Since the internal cavum of the core is a volumetric pipet, its volume remains unchanged. The fetched amount of the liquid is certain. Not only this invention can be used on fetching the liquid medicine, but also can be used on other occasions in which fetching a certain amount of liquid is required. It can be used on a variety of industries such as restaurant, chemistry, agriculture and daily life. This invention features simple structure, convenient and sanitary, without liquid leaking or contamination, and no need for other measuring tools. The operation is quick (be able to finish a fetching within a couple of seconds) and high repeatability (be able to fetch liquid with certain amount repeatedly) especially for fetching oral medicine or pesticide.

The amount of fetched liquid is determined by the rationing cavum which is enclosed by the bottom bevel and the lower internal cavum of the core. The different lengths of the volumetric tube determine different fetching amounts. Therefore, we can change the fetching amount by making the top covers of the volumetric tube with different lengths and changing the top covers.

The bottom of the volumetric tube is a bevel. There is also a bevel at the internal wall at the lower part of the core whose angle is the same as the one of the bevel of the volumetric tube. The core's internal wall and the volumetric tube enclose a rationing cavum which inclines toward the upper edge of the inlet mouth. Also, the fetching mouth inclines upward. The angle α between the center line of the fetching mouth and the center line of the core is no greater than the angle β between the bevel at volumetric tube's bottom bevel, bevel at the core's lower internal bevel and the center line of the core. Such structure will not produce areas that can trap air, ensuring while fetching the liquid, the air in the core may enter the liquid container along the bevel and won't be trapped in the core. Therefore, no affect on the accuracy of the fetched amount.

In the first technical solution, the top cover of this invention is coupled to the top of the outer casing. There is a rotating mechanism between the top cover and the core, through the rotating mechanism, rotate the top cover can drive the core to rotate. While rotating up to the positioner, the fetching mouth and the inlet mouth are fully corresponding and connecting. The liquid then will flow from the liquid container into the internal cavum of the core. The internal cavum of the core has a constant volume. When the core is full of liquid, rotate the top cover, making the top cover leave the outer casing. There is a convoluting mechanism between the core and the outer casing, through the convoluting mechanism, the after-rotating core will rotate to its original position. The fetching mouth and the inlet mouth staggers. The inlet mouth is closed by the internal wall of the outer casing. Then, the liquid in the core is the liquid that is rationed for fetching. The structure is simple but reliable.

Without mounting the top cover, the inlet mouth and the fetching mouth stagger each other. The angle formed by the staggering rotation of the inlet mouth and the fetching mouth is the same as the one formed by the rotation of the heave on the core's external wall and the block on the step in the middle of the outer casing. The length of the thread of the top cover is: while rotating the top cover tightly on the outer casing, the heave in the middle of the core's external wall and the block in the middle of the external wall prop up each other. The inlet mouth and the fetching mouth completely correspond and connect. With such a structure, while coupled tightly, the inlet mouth and the fetching mouth can completely connect. Meanwhile, when tighten the top cover, the heave on the middle of the external wall of the core props up to the block on the step of the middle of the outer casing. The heave and the block, functioning as positioners, ensure the complete connection between the inlet mouth and the fetching mouth.

Another solution is to slide the core vertically along the internal wall of the outer casing to make the fetching mouth and the inlet mouth corresponding or staggering. There is an elastic component between the bottom cover and the core's bottom that stretches and compresses vertically. While the top cover is tightened, the elastic component compresses and the fetching mouth on the outer casing and the inlet mouth on the core completely corresponding and connecting. The liquid enters the internal cavum of the core. After the fetching, rotate and open the top cover. The elastic component stretches and props up the core to make it move upward. The fetching mouth and the inlet mouth stagger each other. While the fetching mouth is blocked by the elastic component, the inlet mouth is blocked by the internal wall of the outer casing so that to finish the rationing fetching of the liquid. The solution features a simple structure and a convenient/reliable rationing operation.

BRIEF DESCRIPTION OF THE DRAWINGS

Following instructions are combined with the attached Figures and Examples, among the Figures.

DESCRIPTION OF THE PREFERRED EMBODIMENT

Figure 1:
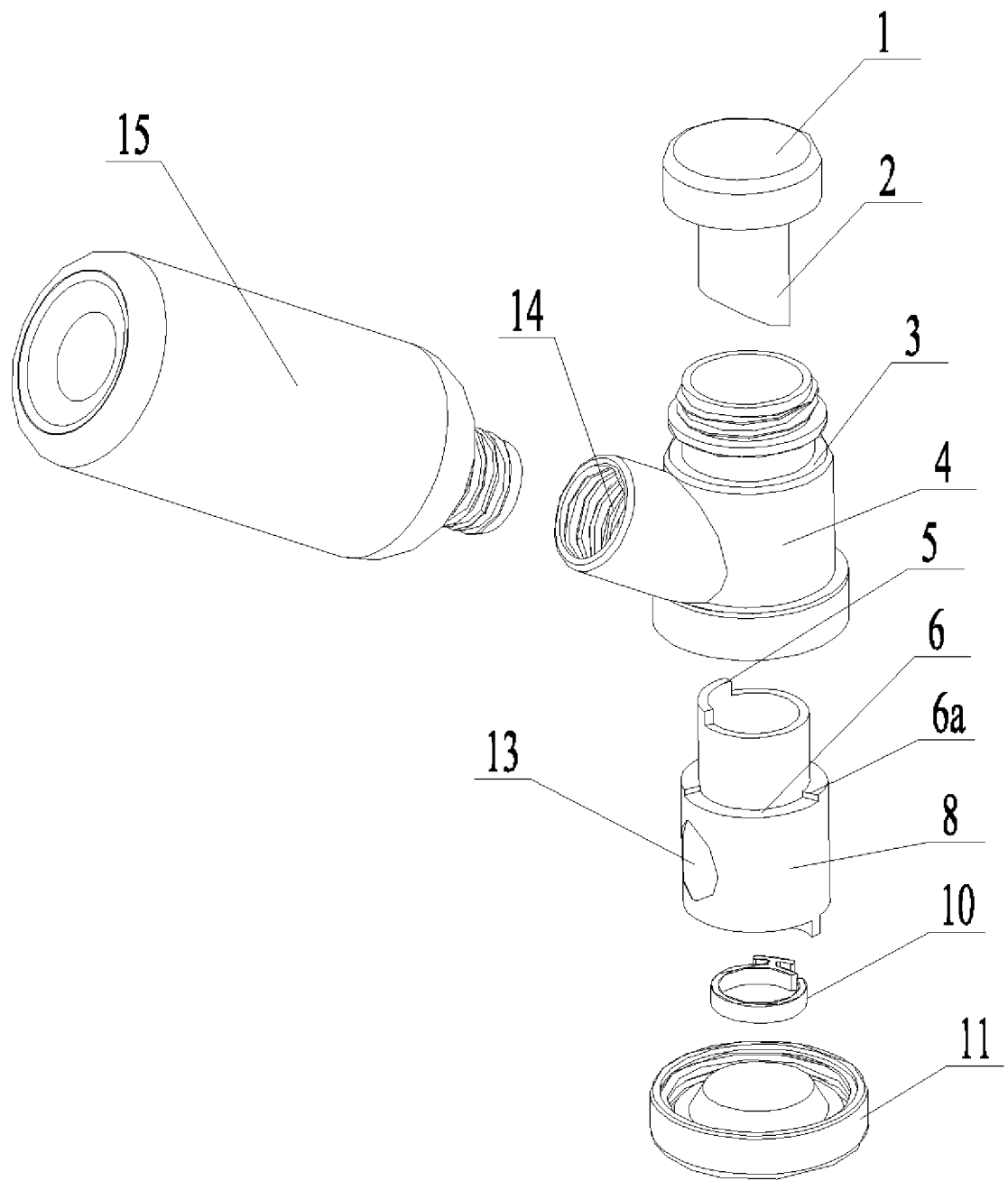
FIG. 1 is the structural sketch map of Example 1 of this invention.
Figure 2:
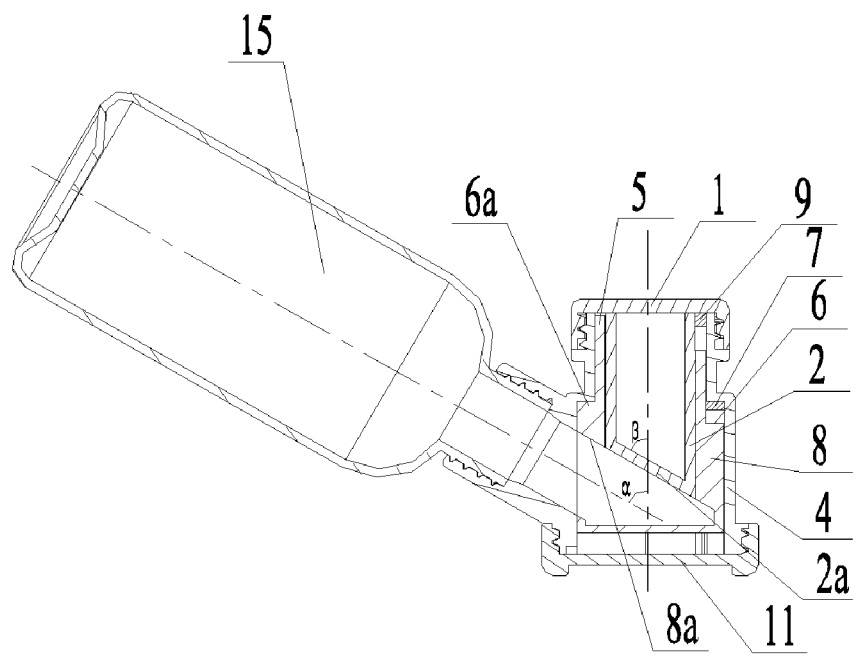
FIG. 2 is the sketch map showing the connected fetching mouth and inlet mouth in Example 1 of this invention.

In Example 1, as shown in FIGS. 1 and 2, a volumetric pipet includes an outer casing 4. At its lower part, there is a fetching mouth 14 which is detachably mounted to a liquid container 15. In this example, the liquid container 15 and the fetching mouth 14 are coupled with threads. They can also be coupled by buckles. The fetching mouth 14 can be buckled up to the bottleneck of the liquid container 15. Between the two parts, there is a sealing gasket. There is a detachably sealed top cover 1 on the top of the outer casing 4. In this example, the top cover 1 is coupled with thread to the top of the outer casing 4. There is an upward core 8 in the outer casing 4. There is a rotating mechanism between the top cover 1 and the core 8. Rotation of the top cover 1 drives the core 8 to rotate through the rotating mechanism. There is a convoluting mechanism between the core 8 and the outer casing 4, through the convoluting mechanism, the rotated core 8 will return to its original position. On the side wall of the core 8, there is an inlet mouth 13 corresponding to the fetching mouth 14 of the outer casing 4. The internal wall surface of the outer casing 4 is slip fitted with the external wall surface of the core 8. The core 8 rotates in order to make the fetching mouth 14 and the inlet mouth 13 being aligned or staggered with each other. The rotating mechanism comprises a step 5 on top of the core 8 and a block 9 at the lower part of the top cover 1, which corresponds to the step 5. When rotating the top cover 1, the block 9 will prop up the side of the step 5 to drive the core 8 to rotate. The corresponding steps 6 and 3 are respectively located in the middle of the external wall surface of the core 8 and the middle of the internal wall surface of the outer casing 4. There is a positioner between the core 8 and the internal wall surface of the outer casing 4. The positioner includes a heave 6a located on the outside step 6 of the core 8, and a block 7 which corresponds to the heave 6a on the inside step 3 of the outer casing 4. While the core 8 rotates and the block 7 props up the side of the heave 6a, the fetching mouth 14 are completely aligned and communicated with the inlet mouth 13. There is a column-shaped volumetric tube 2 at the center of the bottom of the top cover 1. The external wall surface of the volumetric tube 2 is slip fitted with the internal wall surface of the core 8. The bottom of the volumetric tube 2 forms a bevel. The highest point on the bevel 2a of the volumetric tube 2 corresponds to the block 9 on the bottom of the top cover 1. There is also a bevel 8a on the wall of the lower part of the core 8 whose angle is identical with the one of the bevel on the volumetric tube 2.

Without screwing the top cover 1 up, the inlet mouth 13 and the fetching mouth 14 are staggered with each other. An angle that is formed by the staggering rotation of the inlet mouth 13 and the fetching mouth 14 is the same as an angle formed by the rotation of the heave 6a on the external wall surface of the core and the block 7 on the step 3 in the middle of the outer casing. In this example, the angle formed by the staggering rotation of the inlet mouth 13 and the fetching mouth 14 is 120°. The angle formed by the rotation of the heave 6a on the external wall surface of the core and the block 7 on the step 3 of the middle of the outer casing is also 120°. While the fetching mouth 14 and the inlet mouth 13 are completely aligned and communicated, the bevel 2a on the bottom of the volumetric tube 2 is aligned with the bevel 8a on the internal wall surface at the lower part of the core 8 to form a complete bevel. The wall of the core 8 and the volumetric tube 2 together enclose a rationing cavum inclined toward the upper edge of the inlet mouth 13. The fetching mouth 14 inclines upward. An angle $\alpha$ between the central axes of the fetching mouth 14 and the central axes of the core 8 is no greater than the angle $\beta$ between the bevel 2a at the bottom of the volumetric tube 2, the bevel 8a at the lower internal wall of the core and the central axes of the core 8. In this example, the angle $\alpha$ between the central axes of the fetching mouth 14 and the central axes of the core 8 equals to the angle $\beta$ between the bevel 2a at the bottom of the volumetric tube 2, the bevel 8a at the lower internal wall of the core 8 and the central axes of the core 8. The length of the internal and external threads of the top cover 1 and the outer casing 4 is configured that while rotating the top cover 1 tightly up to the outer casing 4, the heave 6a in the middle of the external wall surface of the core 8 and the block 7 on the step 3 in the middle of the outer casing props up each other. The inlet mouth 13 and the fetching mouth 14 are fully aligned and communicated.

Figure 3:
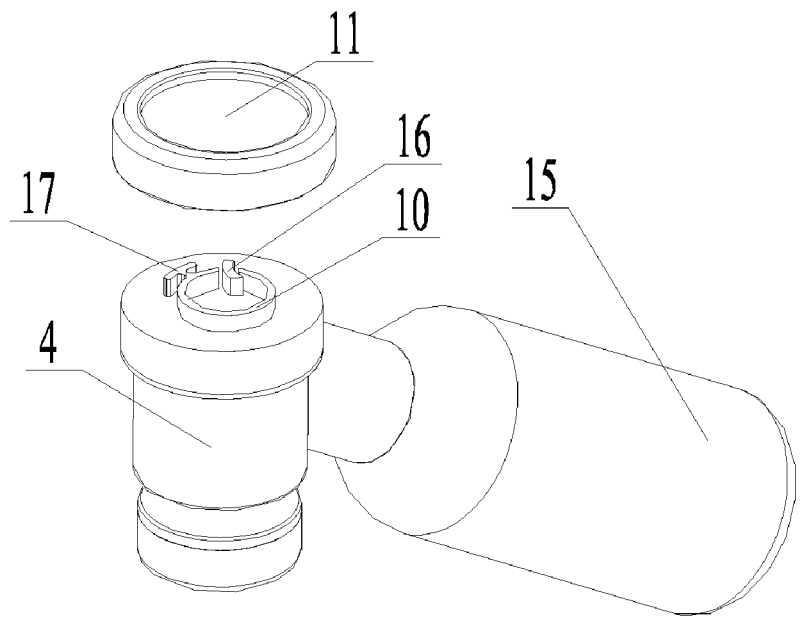
FIG. 3 is the structural sketch map of the convoluting mechanism in Example 1 of this invention.

As shown in FIG. 3, there is a bottom cover 11 which is detachably mounted at the lower part of the outer casing 4. The convoluting mechanism includes a convolver 10 located on the bottom of the core 8. In this Example, the convolver 10 is a C-shaped spring. There is a T-shaped piece 17 on one end of the C-shaped spring. The T-shaped piece 17 is mounted on the bottom cover 11 of the outer casing 4. The other end of the C-shaped piece is mounted on the core 8 or propped up to the block on the bottom of the core 8. When rotating the top cover 1, the core 8 will be driven to rotate, the C-shaped spring will be opened. When releasing the top cover 1, under the elasticity of the C-shaped spring, the core 8 will convolute. The convolver may also have other structures like torsion spring or shrapnel.

Figure 4:
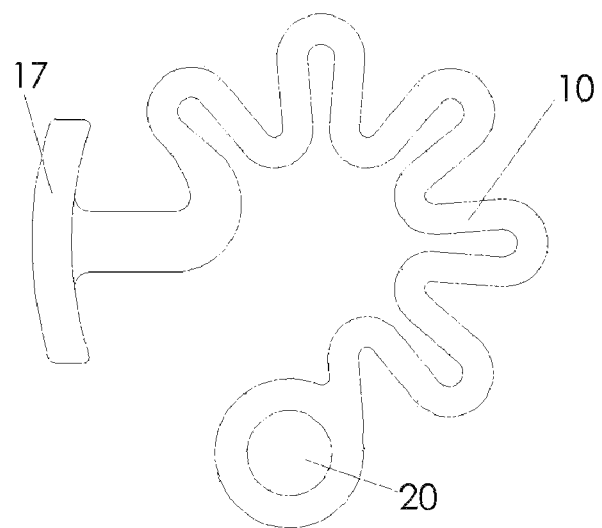
FIG. 4 is the structural sketch map of another carrying-out method for the convoluting mechanism in Example 1 of this invention.

As shown in FIG. 4, the C-shaped spring can also be formed by being bended and coiled. Springs with this structure have more elasticity and endure longer. One end of the C-shaped spring has a T-shaped piece 17. The T-shaped piece is fixed on the bottom cover 11 of the outer casing 4. The other end of the C-shaped spring has a sleeve 20. The sleeve 20 is mounted on a fixing column on the bottom of the core 8.

Under the circumstance that the top cover is tightened on the volumetric pipet, the fetching mouth and the inlet mouth are aligned and communicated. While the liquid container is screwed up to the fetching mouth, liquid in the liquid container will flow into the rationing cavum in the core. Air in the core enters the liquid container. While the cavum of the core is full of liquid, the core will rotate under elasticity of the convolver by unscrewing the top cover, then the inlet mouth is closed, liquid in the liquid container and liquid in the core will be separated. Liquid that is left in the core can be poured out of the core when the top cover is taken off.

Figure 5:
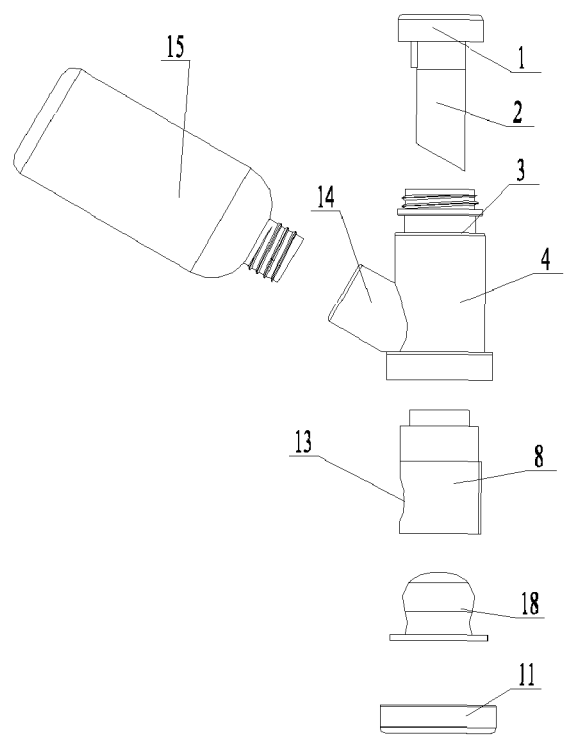
FIG. 5 is the structural sketch map in Example 2 of this invention.
Figure 6:
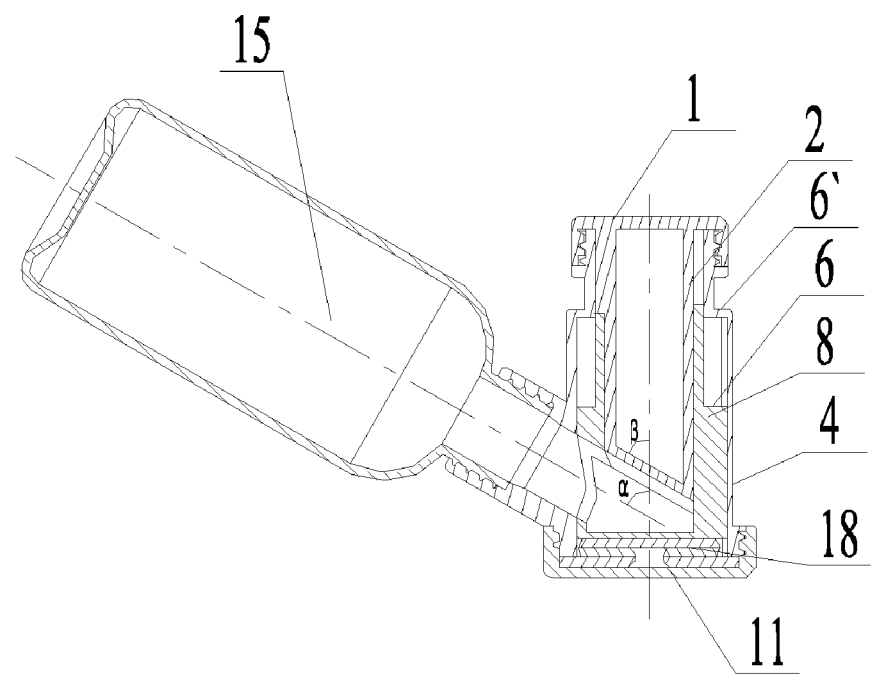
FIG. 6 is the structural sketch map showing the connected fetching mouth and inlet mouth in Example 2 of this invention.
Figure 7:
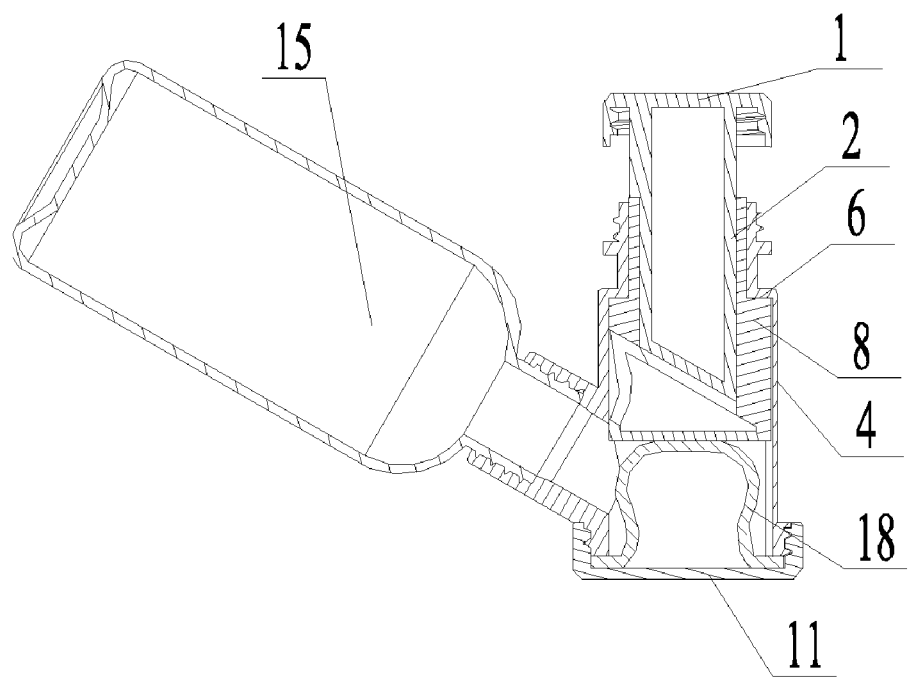
FIG. 7 is the structural sketch map of the staggered fetching mouth and inlet mouth in the Example 2 of this invention.

In Example 2, as shown in FIGS. 5, 6 and 7, a volumetric pipet includes an outer casing 4. There is a fetching mouth 14 located at the lower part of the outer casing 4 which is detachably mounted to a liquid container 15. In this example, the liquid container 15 and the fetching mouth 14 are coupled with thread. They can also be coupled by buckles. The fetching mouth 14 can be buckled up to the bottleneck of the liquid container 15. Between the two parts, there is a sealing gasket. There is a detachably sealed top cover 1 on the top of the outer casing 4. In this example, the top cover 1 is coupled with thread to the top of the outer casing 4. There is an upward core 8 in the outer casing 4. On the side wall of the core 8, there is an inlet mouth 13 that corresponds to the fetching mouth 14 of the outer casing 4. The internal wall surface of the outer casing 4 is slip fitted with the external wall surface of the core 8. The core 8 moves relative to the outer casing 4 to make the fetching mouth 14 and the inlet mouth 13 being aligned or staggered with each other. A bottom cover 11 is mounted with thread at the lower part of the outer casing 4. In this Example, the lower part of the outer casing 4 coupled with thread to the bottom cover 11. Between the bottom cover 11 and the bottom of the core 4, there is an elastic component 18 which can be stretched and compressed vertically along the outer casing 4. When the elastic component 18 is compressed, the fetching mouth 14 on the outer casing 4 and the inlet mouth 13 on the core 8 are aligned and communicated with each other. While the elastic component 18 is stretched, the core 8 will move upward and the fetching mouth 14 on the outer casing 4 and the inlet mouth 13 on the core 8 are staggered. The outer casing 4 has a limitator to prevent the core 8 from disengaging the top of the outer casing 7. The elastic component 18 has a Ω-shaped longitudinal section. The elastic component can be made out of elastic rubber. Its top props up the bottom of the core and its bottom is fixed on the top of the bottom cover 11.

The cavum of the outer casing 4 has a small upper part and a large lower part through the transition of a step 6' at the middle of the outer casing 4, the limitator is the step 6 at the middle of the outer casing 4. There is also a step 6 on the external wall surface of the core 8 above the inlet mouth 13 which corresponds to the step 6' on the outer casing. While the core 8 moves upward to the external step 6 of the core 8 propping up the step 6 of the outer casing, it is limited. There is a column-shaped volumetric tube 2 at the center of the bottom of the top cover 1. The external wall surface of the volumetric tube 2 and the internal wall surface of the core 8 are slip fitted with each other. The bottom of the volumetric tube 2 forms a bevel. There is also a bevel 8a on the wall of the lower part of the core 8 whose angle is the same as the one of the bevel on the volumetric tube 2. The core 8 and the volumetric tube 2 enclose a rationing cavum inclined toward the upper edge of the inlet mouth 13.

The length of the internal and external threads of the top cover 1 and the outer casing 4 is configured that while tightening the top cover 1 up to the outer casing 4, the inlet mouth 13 and the fetching mouth 14 are completely aligned and communicated.

While the top cover is tightened up on the volumetric pipet, the fetching mouth and the inlet mouth are aligned. While mounting the liquid container on the fetching mouth, liquid in the liquid container will flow into the rationing cavum in the core. Air in the core will enter the liquid container. While the cavum of the core is full of liquid, the core moves upward under the elasticity of the elastic component by rotating and loosing the top cover, and the inlet mouth is closed. Liquid in the liquid container and the liquid in the core will be separated. Liquid that is left in the core can be poured out of the core when the top cover is taken off.

What is claimed is:

1. A volumetric pipet, comprising:
    an outer casing;
    a liquid fetching mouth arranged at a lower part of the outer casing;
    a liquid container detachably mounted to the liquid fetching mouth;
    a top cover provided at the top of the outer casing, which is detachably sealed to the outer casing;
    a hollow core with a top opening arranged inside the outer casing; and
    an inlet mouth on the side wall of the core;
    wherein an internal wall surface of the outer casing is slip fitted with an external wall surface of the core, and the core is rotatable or slidable along its longitudinal orientation relative to the outer casing to make the liquid fetching mouth being aligned or staggered with the inlet mouth.

2. The volumetric pipet according to claim 1, wherein the top cover is coupled with the top of the outer casing with threads; a rotating mechanism is provided between the top cover and the core, wherein rotation of the top cover drives the core to rotate through the rotating mechanism; and a convoluting mechanism is provided between the core and the outer casing, through which the rotated core can return to its original position.

3. The volumetric pipet according to claim 2, wherein the rotating mechanism includes a step located on the top of the core and a block located on the bottom of the top cover that corresponds to the step, wherein the block props up a side of the step to drive the core to rotate when the top cover is rotated.

4. The volumetric pipet according to claim 3, wherein the convoluting mechanism includes a convolver located on the bottom of the core, one end of the convolver being fixed on the outer casing, and the other end being fixed on the core.

5. The volumetric pipet according to claim 4, wherein corresponding steps are provided in the middle of the external wall surface of the core and in the middle of the internal wall surface of the outer casing respectively; and a positioner is arranged between the core and the internal wall surface of the outer casing, the positioner includes a heave located on the step of the external wall surface of the core and a block corresponding to the heave located on the step of the internal wall surface of the outer casing; wherein the liquid fetching mouth is completely aligned and communicated with the inlet mouth while the core rotates to cause the block on the internal wall surface of the outer casing propping up to a side of the heave.

6. The volumetric pipet according to claim 5, wherein an angle formed by staggering rotation of the inlet mouth and the liquid fetching mouth is the same as an angle formed by the rotation of the heave on the external wall surface of the core and the block on the step in the middle of the outer casing when the top cover is unscrewed on the outer casing; the top cover at the center of its bottom has a volumetric tube, a bottom of which forms a bevel, wherein the bevel of the volumetric tube is aligned with a corresponding bevel formed on the wall of a lower part of the core when the liquid fetching mouth is completely aligned and communicated with the inlet mouth; and length of the thread on the top cover is configured that while the top cover is tightened up to the outer casing, the heave in the middle of the external wall surface of the core and the block on the step in the middle of the outer casing props up each other, and the inlet mouth and the liquid fetching mouth are completely aligned and communicated.

7. The volumetric pipet according to claim 6, wherein an external wall surface of the volumetric tube is slip fitted with the internal wall surface of the core; a highest point of the bevel of the volumetric tube corresponds to the block on the bottom of the top cover; and the wall of the core and the volumetric tube enclose a rationing cavum which inclines toward an upper edge of the inlet mouth.

8. The volumetric pipet according to claim 7, wherein the liquid fetching mouth inclines upwardly, and an angle α between a central axes of the liquid fetching mouth and a central axes of the core is no greater than an angle β between the bevel at the bottom of the volumetric tube, the bevel at the wall at the lower part of the core and the central axes of the core.

9. The volumetric pipet according to claim 1, further comprising a bottom cover detachably fixed on a lower end of the outer casing, and an elastic component which can be stretched and compressed vertically along the outer casing is provided between the bottom cover and the bottom of the core, wherein the liquid fetching mouth on the outer casing is aligned and communicated with the inlet mouth on the core when the elastic component is compressed, and the liquid fetching mouth on the outer casing is staggered with the inlet mouth on the core due to upward movement of the core when the elastic component is stretched; and the outer casing has a limitator to prevent the core from disengaging the top of the outer casing.

10. The volumetric pipet according to claim 9, wherein the top cover is coupled with the top of the outer casing with thread; the lower end of the outer casing is coupled with the bottom cover with thread; corresponding steps are provided respectively on the internal wall surface at the middle of the outer casing and on the external wall surface of the core above the inlet mouth, and the limitator is the step located on the internal wall surface at the middle of the outer casing, wherein the core is limited when it moves upwardly to the step on the external wall surface of the core propping up the step on the outer casing.

11. The volumetric pipet according to claim 10, wherein the elastic component has a Ω-shaped longitudinal section, with its top propping up the bottom of the core and its bottom being fixed on the top of the bottom cover.

12. The volumetric pipet according to claim 11, wherein the top cover at the center of its bottom has a volumetric tube, and an external wall surface of the volumetric tube is slip fitted with the internal wall surface of the core; the volumetric tube at its bottom forms a bevel, wherein the bevel of the volumetric tube is aligned with a corresponding bevel formed on the wall of a lower part of the core when the liquid fetching mouth is completely aligned and communicated with the inlet mouth; and the wall of the core and the volumetric tube enclose a rationing cavum which inclines toward an upper edge of the inlet mouth.

13. The volumetric pipet according to claim 12, wherein the liquid fetching mouth inclines upwardly, and an angle $\alpha$ between a central axes of the liquid fetching mouth and a central axes of the core is no greater than an angle $\beta$ between the bevel at the bottom of the volumetric tube, the bevel at the wall at the lower part of the core and the central axes of the core.

* * * * *